Patented Aug. 21, 1928.

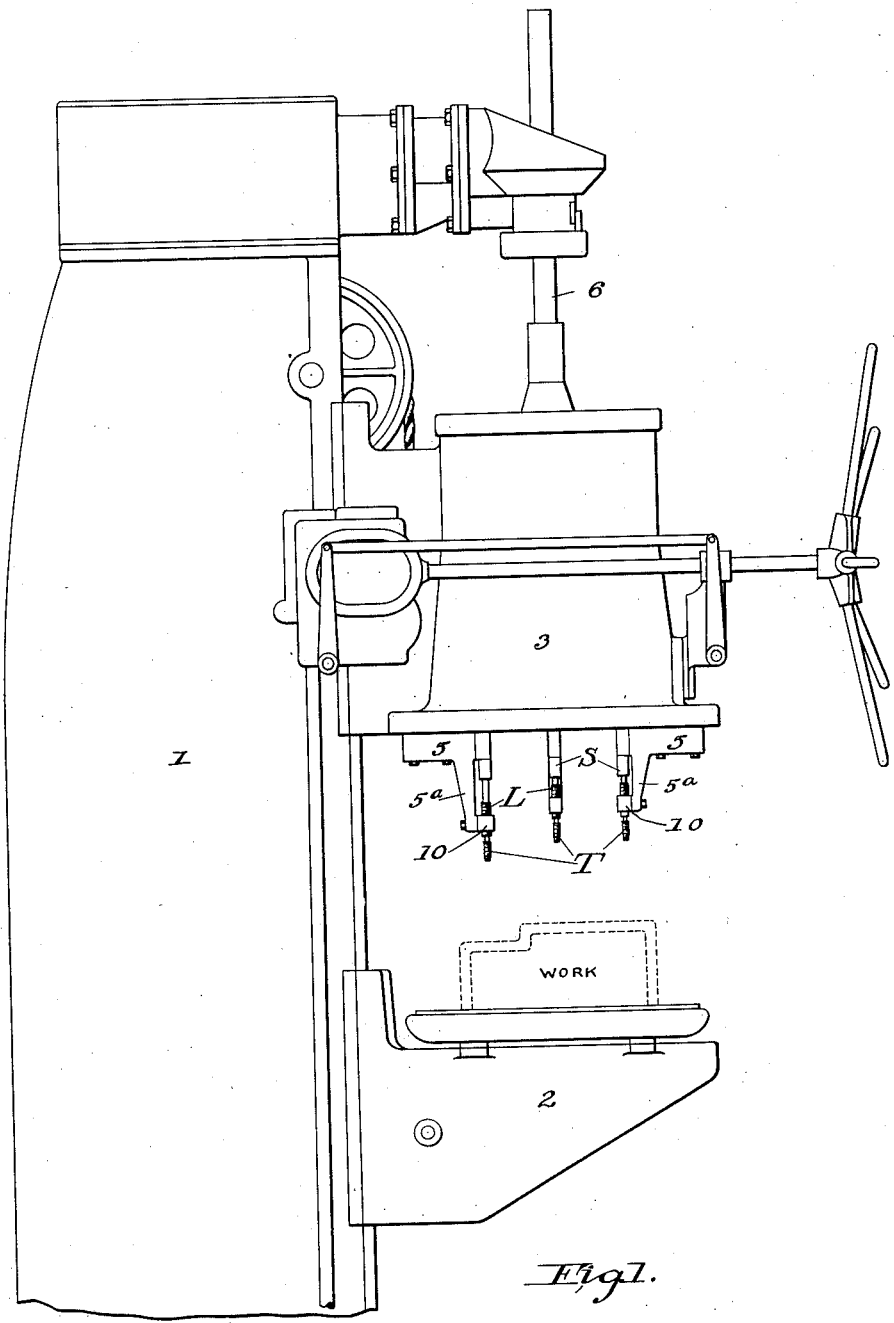

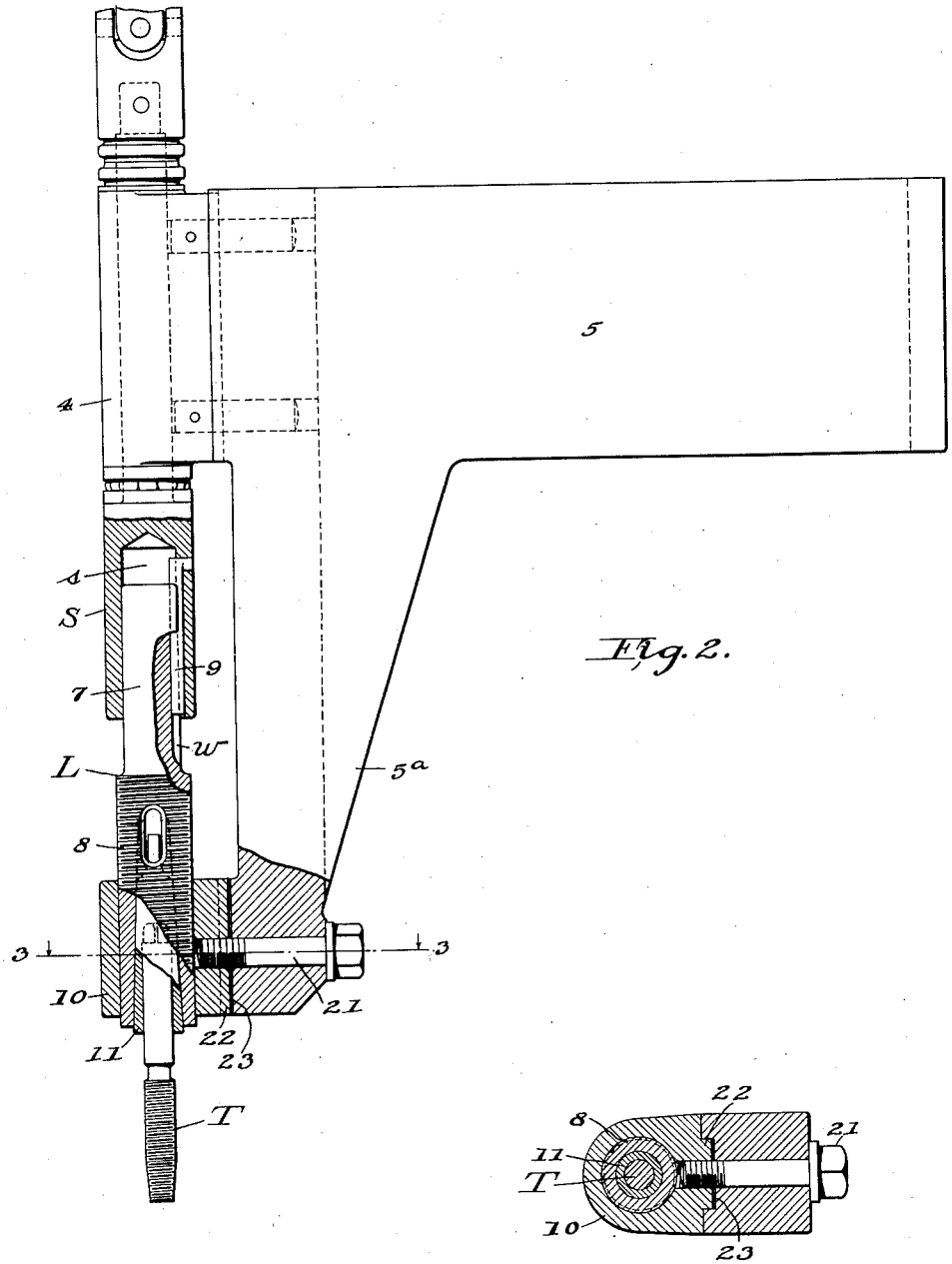

1,681,326

UNITED STATES PATENT OFFICE.

ADOLPH L. DE LEEUW, OF PLAINFIELD, NEW JERSEY.

INDIVIDUAL POWER FEED FOR MULTIPLE TAPPING MACHINES.

Application filed November 18, 1926. Serial No. 149,243.

This invention relates to multiple spindle machine tools and it deals more particularly with means for feeding the individual tools axially independently of each other and independently of the spindles, as they are being rotated thereby. This invention is particularly adaptable to multiple spindle tapping machines in which the axial movement may be utilized to feed the taps into the work.

In the manufacture of certain products it is necessary that holes of substantially different diameters to be tapped with threads of various pitch and inasmuch as each different pitch thread requires a different tap feed, and as multiple spindle tapping machines, as commonly constructed, provide no means for feeding the individual taps independently of each other, it has heretofore been difficult to utilize these machines simultaneously to tap a plurality of holes having threads of different pitch. To perform tapping operations by multiple spindle machines of the type in which the spindles are journaled in a single head, it has heretofore been customary to provide tap-holders each having individual float, i. e. the tap is so held in the tap-holder that relative axial movement is permitted between the two. With this construction the feed of each tap is effected by the lead thereof and no means is provided for positively advancing the tap at the proper rate. This method of tapping threads is not entirely satisfactory because of the fact that the taps are subjected to end strains which cause them to drag, with the results that they do not advance at the proper rate and therefore produce defective threads.

This invention has for an object to provide, in a multiple spindle machine, simple and effective positively acting means simultaneously and individually to advance a plurality of taps, of various pitch, at rates coordinated with the speed of rotation of the taps so that the taps will simultaneously tap threads of different pitch without undue strains on the work or taps.

Another object of this invention is to provide individual positive feeds for a plurality of taps carried by adjustably mounted spindles and so to construct the tap feeds that they will not interfere with universal adjustments of the spindles.

Still another object of the invention is to provide individual positive feeding means for a plurality of taps carried by the adjustably mounted spindles of conventional multiple drilling and tapping machines and so to construct and support said feeding means that they will not interfere with the very close nesting of the spindles which is frequently necessary in multiple tapping.

These objects have been attained by embodying in a multiple spindle machine tool individual lead-screws each translatably but non-rotatably connected with one of the spindles. Each lead-screw is threaded through a stationary nut and is designed to receive an adapter within which standard taps of various sizes may be secured. As the lead-screw is rotated by the spindle its engagement with the fixed nut causes the lead-screw and the tap carried thereby to be fed axially a predetermined amount at each rotation of the spindle, therefore by selecting a lead-screw and nut having the same pitch thread as the tap to be used the rotary and axial movements of the lead-screw will be so coordinated as to cause the tap to cut a perfect thread into the work. This invention proposes various ways of supporting the lead-nuts. One of these consists in securing each of the nuts to one of the spindle supporting and adjusting arms adjustably carried by the tool-head. With this arrangement each of the nuts is universally adjustable with its cooperating lead-screw and the spindle carrying the same.

Another advantage obtained by supporting the lead-nuts from the individual spindle arms (as distinguished from a plate support for all nuts) is that the nuts may be arranged in materially different horizontal planes (in upright tapping machines) to agree with various levels of the work in which it is desired to tap holes, thus holding the taps rigid and applying the feeding power closely adjacent the taps which is desirable.

Other objects and advantages will be in part indicated in the following description and in part rendered apparent therefrom in connection with the annexed drawings.

To enable others skilled in the art so fully to apprehend the underlying feature hereof that they may embody the same in the various ways contemplated by this invention, drawings depicting a preferred typical construction have been annexed as a part of this disclosure and, in such drawings like characters of reference denote corresponding parts throughout all the views, of which:—

Figure 1 is a side elevation of a portion of a multiple spindle drilling and tapping machine embodying the present invention. Fig. 2 is an enlarged detail showing one of the spindle supporting and adjusting arms adapted to be secured to the tool-head and the lead nut carried thereby. Fig. 3 is a section on the line 3—3 of Fig. 2.

Referring more particularly to the drawings, the invention is disclosed as embodied in a multiple drilling and tapping machine comprising a standard 1 upon which is adjustably supported a work-table 2 and a tool-head 3. Within bearings 4 carried by arms 5 adjustably secured to the tool-head are rotatably journaled a plurality of tool spindles S adapted selectively to be rotated individually at any one of a plurality of rates from the power shaft 6 entering the tool-head from the top. Inasmuch as the means for rotating the spindles and for varying their individual speed of rotation are conventional and form no part of this invention detailed illustration and description thereof is deemed unnecessary. The spindle supporting arms are universally adjustable on the tool-head and therefore any desired arrangement of spindles may be secured. Although Fig. 1 shows only three spindles carried by the tool-head it is to be understood that this is merely illustrative and that in practice a materially greater number may be employed.

As hereinbefore stated this invention provides means to translate the tools as they are rotated by the spindles. To this end each spindle has translatably but non-rotatably secured within its bore $s$ the shank 7 of a lead-screw L. A spline 9, carried by the spindle is fitted to a way $w$ in the shank 7 and thereby causes the lead-screw to be rotated with the spindle while permitting it to be moved axially in the spindle. The lead-screw is formed with a threaded portion 8 which engages a stationary lead-nut 10 and therefore rotation of the screw L in the nut causes the screw to be moved in the direction of its length. The lead-screw is adapted to carry standard taps T of various sizes and these taps may be connected with the spindle by means of a tapered adapter 11 fitted within a tapered bore 12 in the lead-screw and formed with a tap-receiving socket 13.

For certain classes of work it is desirable to have the lead-nuts carried by the spindle-supporting arm so that the spindle may be adjusted to various positions without disturbing the tap feeding means. To that end the arms 5 may be provided with extensions 5ª of any desired length to which the lead nuts 10 may be secured as by means of bolts 21 passing through the extension and threaded into the nuts. To prevent turning of the nuts about the axis of the bolts 21 the nuts may be provided with tongues 22 fitted into complemental grooves 23 in the extensions 5ª.

In practice the pitch of the thread of the lead-screw and lead-nut will be the same as the pitch of the tap being used so that the lead-screw will be advanced at the same rate as the tap. The lead-screw and lead-nut are readily removable and therefore they may be removed at will and replaced by others having a different pitch when a different pitch tap is to be used.

From the foregoing it will be perceived that this invention provides a construction having all of the advantages of prior multiple spindle tapping machines in which the feed of the tap is effected by the tap itself (i. e. permitting a plurality of holes to be tapped simultaneously with threads of different pitch, in a great number of different spindle arrangements) and that in addition thereto it relieves the tap and the work of great strains and therefore produces better threads and reduces tap breakage.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A multiple tapping machine combining a work-support; a translatable head; a plurality of spindles rotatably journaled in said head; taps rotated by said spindles; and individual means cooperating with each tap and movable with said head to translate said taps independently of each other.

2. A multiple tapping machine combining a work-support; a translatable head; a plurality of rotatable spindles journaled in said head; taps rotated by said spindles and individual means cooperating with each tap and carried by said head to translate said taps simultaneously at unequal rates.

3. A multiple tapping machine combining a work-support; a translatable head; a plurality of rotatable spindles journaled in said head; means to rotate said spindles;

a tap rotated by each of said spindles; and individual means cooperating with each tap and carried by said head independent of said spindle-rotating means to translate said taps independently of each other.

4. A multiple spindle tapping machine combining a work-support; a translatable head; a plurality of rotatable spindles journaled in said head; means to rotate said spindles simultaneously at unequal rates; a tap rotated by each of said spindles; and individual means cooperating with each tap and carried by said head and independent of said spindle-rotating means to translate said taps simultaneously at unequal rates.

5. A multiple tapping machine combining a work-support; a translatable head; a plurality of rotatable spindles journaled in said head; means to rotate said spindles at unequal rates; taps rotated by said spindles; individual means cooperating with each tap and carried by said head and cooperating with said spindle rotating means simultaneously to translate said taps independently of each other as they are rotated at unequal speeds.

6. A multiple tapping machine combining a work-support; a translatable head; a plurality of rotatable spindles journaled in said head; a tap rotated by each of said spindles; and individual means cooperating with each tap and carried by said head operative at each rotation of the spindles to give to said taps individual axial movement substantially equal in extent to the pitch of the tap rotated thereby.

7. A multiple tapping machine combining a work-support; a translatable head; a plurality of rotatable spindles journaled in said head; a lead-screw translatable but non-rotatable relative to each of said spindles; a tap carried by each of said lead-screws; and a lead-nut supported from said head and having a threaded connection with each of said lead-screws to give to said lead-screws individual axial movements.

8. A multiple tapping machine combining a work-support; a translatable head; a plurality of rotatable spindles journaled in said head; a tap rotatable by each of said spindles; and individual power means cooperating with each tap and carried by said head positively to translate said taps simultaneously at predetermined unequal rates.

9. A tapping machine combining a tool-head; a plurality of rotatable spindles adjustably supported thereon for lateral movement; a threaded member translatably but non-rotatably connected with each of said spindles; a tap rotated by each of said members; a normally stationary nut engaging each of said threaded members and serving to cause translation of said members as they are rotated by the spindle; and means to cause said nuts to partake of the adjusting movements of said spindles.

10. A tapping machine combining a tool-head; a plurality of spindle-supporting arms adjustably secured to said tool-head; a spindle supported by each of said arms; a threaded member translatably but non-rotatably carried by each of said spindles; a tap carried by each of said threaded members and adapted to be rotated thereby; a plurality of nuts each having a threaded engagement with one of said members and serving to translate said members independently as they are rotated by the spindles; and means to support said nuts from said spindle supporting arms.

11. A tapping machine combining a tool-head, a plurality of spindle supporting arms adjustably secured to said tool-head, each of said arms being provided with a portion extending beyond the end of said spindles; a lead-screw translatably but non-rotatably carried by each of said spindles; a tap carried by each of said lead-screws and adapted to be rotated and translated thereby; and a lead-nut secured to each of the extended portions of said arms and having a threaded engagement with one of said lead-screws to cause said lead-screws and the tap carried thereby to be fed axially as it is rotated.

12. A multiple tapping machine combining a work-support; a head, said work-support and head being relatively movable toward each other; a plurality of spindles rotatably journaled in said head; a tap actuated by each of said spindles; means to rotate said spindles and taps; a lead-screw and a lead-nut associated with each of said taps to give each of said taps a predetermined axial feed during its rotation; and means to support said lead-nuts at various distances from said work-support to agree with various levels of the work in which it is desired to tap holes.

13. A tapping machine combining a tool-head; a work-support, said tool-head and work-support being relatively movable toward each other; a plurality of spindle supporting arms secured to said tool-head; a spindle rotatably supported by each of said arms; a lead-screw translatable but non-rotatable relative to each of said spindles; a tap carried by each of said lead-screws; a lead-nut having a threaded engagement with each of said lead-screws; and extensions of various lengths projecting from said spindle-supporting arms and each supporting one of said lead-nuts at a predetermined distance from irregular surfaces of a work piece.

In witness whereof, I have hereunto subscribed my name.

ADOLPH L. DE LEEUW.